C. M. DICUS.
ROAD SCRAPER.
APPLICATION FILED MAY 6, 1919.
1,350,991. Patented Aug. 24, 1920.
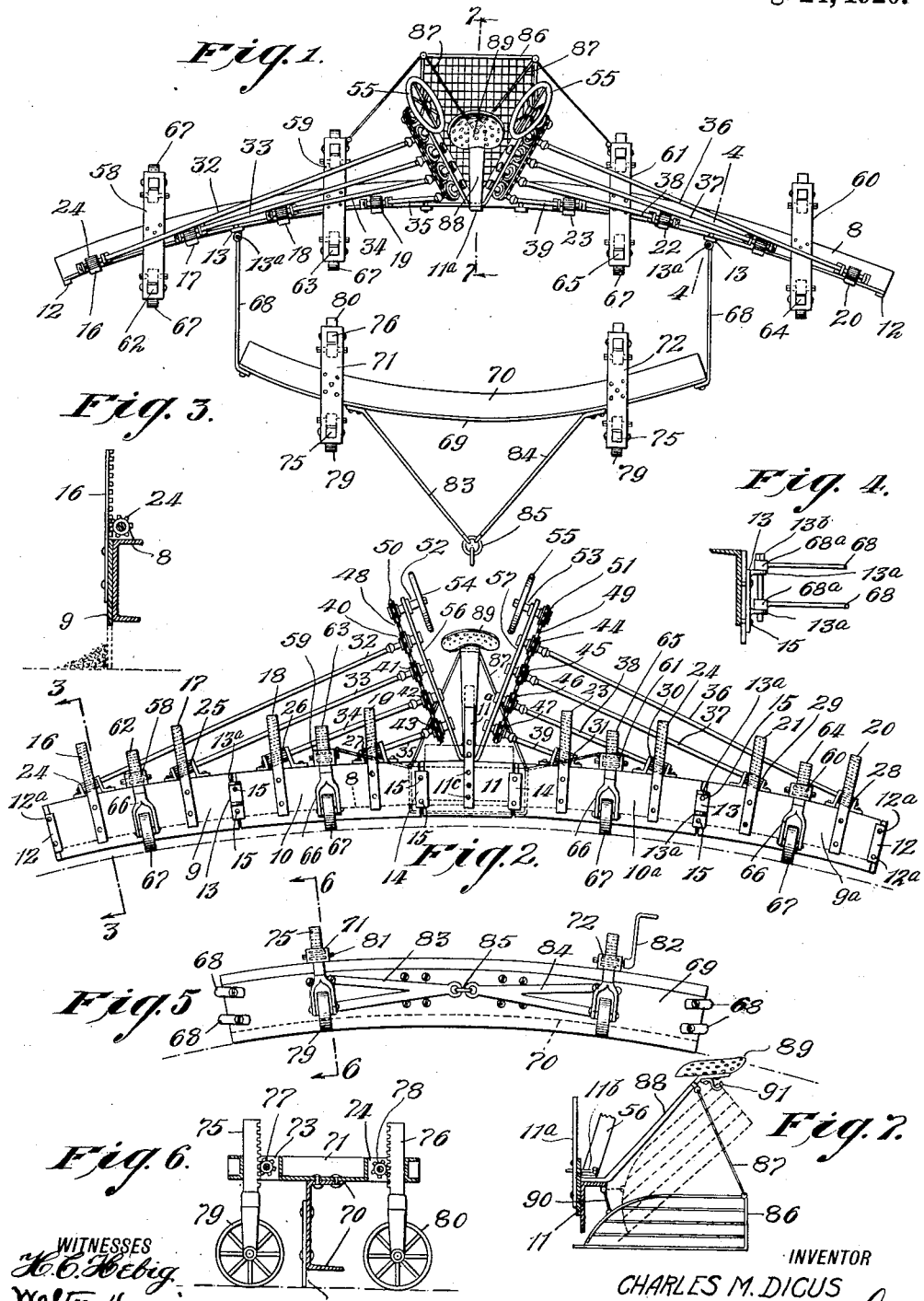
INVENTOR
CHARLES M. DICUS
BY
ATTORNEYS
WITNESSES

UNITED STATES PATENT OFFICE.

CHARLES M. DICUS, OF MILL SPRING, NORTH CAROLINA.

ROAD-SCRAPER.

1,350,991.  Specification of Letters Patent.  Patented Aug. 24, 1920.

Application filed May 6, 1919. Serial No. 295,048.

*To all whom it may concern:*

Be it known that I, CHARLES M. DICUS, a citizen of the United States, and a resident of Mill Spring, in the county of Polk and State of North Carolina, have invented a new and Improved Road-Scraper, of which the following is a full, clear, and exact description.

My invention relates to road scrapers of a type suitable for use upon country roads and having such form and construction as to be readily operated at a comparatively low cost.

More particularly stated, my improved road scraper is a comparatively simple machine and can be drawn by horses or by a gasolene tractor as desired and can be readily operated by one man or two men as desired.

Among the purposes sought to be accomplished by my invention are the following:

I. To enable the machine to gather up large stones and loose trash so as to collect the same together and convey it for any desired distance.

II. To give the road bed a true and proper conformity with a minimum expenditure of power for the purpose.

III. To enable the machine to be readily placed in such form as to pass across a bridge or through a tunnel, certain parts of the mechanism being changed in position for this purpose.

IV. To enable the scraper blades all to be controlled from a single point by the operator.

V. To provide certain adjusting mechanism for positioning the various movable parts.

VI. To improve generally the structure of devices of this general character in order to increase their efficiency.

Reference is made to the accompanying drawing forming part of this specification and in which like letters indicate like parts through the several figures.

Figure 1 is a plan view of my improved road scraper;

Fig. 2 is a front elevation, certain parts being removed;

Fig. 3 is a section on the line 3—3 of Fig. 2 looking in the direction indicated by the arrows;

Fig. 4 is a fragmentary section on the line 4—4 of Fig. 1;

Fig. 5 is a front elevation of the forward scraper blade and parts immediately associated therewith;

Fig. 6 is a section on the line 6—6 of Fig. 5 looking in the direction indicated by the arrows;

Fig. 7 is a section on the line 7—7 of Fig. 1 looking in the direction indicated by the arrows.

Extending the entire maximum width of the machine is a channel beam 8 having a slight curvature in each of two different directions as may be understood from Figs. 1 and 2, that is to say, the channel beam has a slight curvature as indicated in Fig. 2 and has also a slight curvature backward in the center as may be understood from Fig. 1. Carried by the channel beam 8 and disposed adjacent the ends thereof are a pair of scraper blades 9, $9^a$. Another pair of scraper blades 10, $10^a$ are carried by the channel beam 8 and are disposed nearer the middle of the machine. Another scrapper blade 11 is disposed in the approximate middle portion of the channel beam 8. These scraper blades are all movable vertically in relation to the channel beam. At the ends of the channel beam there are two guide plates 12 held in position by bolts $12^a$. These guide plates overlap the adjacent ends of the scraper blades 9, $9^a$. Two other guide plates 13 overlap the opposite ends of the scraper blades 9, $9^a$ and also overlap the adjacent ends of the scraper blades 10, $10^a$. The guide plates 13 are supported upon guide pins 15 which extend intermediate the adjacent ends of the scraper blades. Thus, each scraper blade is backed by the channel beam 8 and is allowed freedom of movement or at least adjustment by the guide plates which engage it and overlap it slightly at its ends. Another pair of guide plates 14 disposed comparatively near the middle of the machine overlap the adjacent edges of the scraper blades 10, $10^a$, 11 as may be understood from Fig. 2. These guide plates 14 are supported upon guide pins 15 of the kind above described. The scraper blade 11 carries an arm $11^a$ extending upwardly and by aid of a pin $11^b$ (see Fig. 7) may be adjusted to different heights as desired. For this purpose the arm $11^a$ is provided with holes $11^c$ through which the pins $11^b$ may be thrust. The scraper blade 9 carries a pair of racks 16, 17 secured rigidly upon it and extending above its upper edge. These racks are alike, the rack 16 being shown more particularly in Fig. 3. Two other racks 18, 19 are similarly mounted upon the scraper blade 10 and the scraper blades 9ª, 10ª are likewise equipped with racks 20, 21, 22, 23, similarly arranged in pairs.

Engaging the racks, respectively, are pinions 24, 25, 26, 27, 28, 29, 30, 31, these pinions being carried upon shafts 32, 33, 34, 35, 36, 37, 38 and 39. The shafts in question are provided with sprocket wheels 40, 41, 42, 43, 44, 45, 46, 47 and engaging these sprocket wheels are sprocket chains 48, 49. The sprocket chains also engage two sprockets 50, 51 carried by short shafts 52, 53, these shafts also carrying hand wheels 54, 55. The operator by turning the hand wheels actuates the sprocket chains and thus causes all the shafts after their pinions to turn, thus raising or lowering the racks and by doing this raises or lowers the scraper blades above described. The various shafts are journaled in a pair of hanger bars 56, 57, the latter being joined at their center and having together an approximate V-form as indicated in Fig. 2. The channel beam 8 carries a number of cross bars 58, 59, 60, 61, secured rigidly upon it and extending through these cross bars are supporting stems 62, 63, 64, 65 arranged in pairs, there being one pair for each bar; that is, each cross bar carries two supporting stems extending vertically through its opposite ends. Each supporting stem is provided with a fork 66 carrying a road wheel 67 and by aid of these parts, the weight of the channel beam 8 and parts carried by it are supported. Each guide plate 13 is provided with a pair of eyes 13ª integral with and extending from it laterally as indicated in Fig. 4. A bolt 13ᵇ extends through these eyes and also through a pair of eyes 68ª carried by brace rods 68 as may be understood from Fig. 4. The brace rods extend forwardly and at their forward ends are secured to a scraper blade 69 having a form indicated more particularly in Fig. 5. This scraper blade 69 is mounted rigidly upon a channel beam 70, the latter being slightly curved in a horizontal plane as indicated in Fig. 1, and also being slightly curved in a vertical plane as shown in Fig. 5. Mounted rigidly upon the channel beam 70 are two cross bars 71, 72. These two bars are exactly alike and the construction of the bar 71 may be understood from Fig. 6. The bar 71 is provided with openings 73, 74 and extending through these openings are racks 75, 76. Engaging these racks are pinions 77, 78 which are revoluble as hereinafter described for the purpose of raising and lowering the cross bars and other parts supported thereby. Each rack bar 75, 76 at its lower end carries a road wheel 79, 80. Each pinion 77, 78 is provided with a stem 81 which projects outwardly a slight distance and is made angular. A wrench 82 may be applied to this stem as indicated at the right of Fig. 5 and used for turning it in order to raise or lower the rack associated with it. In this manner the operator by turning the pinions 77, 78 can raise or lower the channel beam 70 and parts carried thereby. In doing this the operator can adjust the height of the scraper blade 69 relatively to the road bed. A pair of hound bars 83, 84 are secured to the face plate 69 and to the channel beam 70. These bars extend forwardly and converge toward each other. At their forward ends they are connected with a clevis ring 85 to which a tractor or a swingletree may be connected for the purpose of enabling the machine to be dragged forwardly along the road. A catch basket 86 located in the approximate middle of the machine and extending backwardly therefrom is used to gather up loose stones, bricks, and various other kinds of debris and trash as the machine travels along the road. The catch basket has two normal positions, indicated respectively by full and broken lines in Fig. 7. A pair of brace rods 87 are detachably connected to the basket and to the seat post which is shown at 88 and carries the driver's seat 89. The seat post 88 also carries a hook 91 upon which the catch basket 86 may be suspended as indicated by broken lines in Fig. 7. A swinging link 90 is connected with the catch basket for holding it, this link having sufficient flexibility to allow the basket to be tilted back and forth in order that it may assume its two respective normal positions.

The brace rod 68 upon either side of the machine can be disconnected temporarily from the adjacent guide plate 13. When this is done the further forward travel of the machine causes the channel beam 8 to swing backwardly at one side or in other words to gradually assume a longitudinal position parallel with the road. By this arrangement, the machine can very readily be carried over a bridge or through a tunnel.

The operation of my device is as follows: As a general rule, two trips of the machine are necessary in order to place a road in good condition. If the road has scattered along it a good many loose stones, it is often desirable to drive the machine down hill over the road, the catch basket being lowered and the scraper plate 10 in the approximate middle of the machine being raised. This causes the stones to drift toward the center of the machine and into the catch basket. They can be deposited at any desirable point, say in some part of the road where a filling is to be made, or if there be not many of them, they can be allowed to remain in the catch basket until the machine reaches the end of its trip in one direction. The stones being thus disposed of the catch basket is lifted into position indicated by broken lines in Fig. 7 and the scraper blade 11 is lowered as indicated in Fig. 2. This done, the machine is turned around and driven in the opposite direction over the same part of the road. The various scraper blades serve to form the road bed and to abolish or at least ameliorate irregularities upon its surface.

The operator in order to adjust the relative positions of the scraper blades 9, 9ª, 10, 10ª, 11 need not leave his seat. He merely grasps the two hand wheels 54, 55 and turns them so as to raise or lower the scraper blades. It will be noted that these blades are raised or lowered all to the same extent.

If now, the operator wishes to adjust the height of the channel beam 8 at either end or throughout its entire length or if he desires to similarly adjust the channel beam 70, he stops the machine and uses the wrench 82 as indicated at the right of Fig. 5. Thus, by raising and lowering any or all of the cross bars, he correspondingly raises or lowers the channel beams with which the cross bars are associated. A very fine adjustment of the parts can thus be made. This adjustment is necessary owing to the fact that the composition of different roads is variable; one road may be sandy, another one may have a clay soil, and a third may have more or less fertile soil, as for instance where a new road is to be made across a field or through a forest.

The manner in which the scraper blades are adjusted may be readily understood from Fig. 3.

I do not limit myself to the precise mechanism shown as variations may be made therefrom without departing from the spirit of my invention.

Having thus described my invention what I claim as new and desire to secure by Letters Patent is as follows:

1. A road scraper comprising a supporting frame, a plurality of scraper blades mounted upon said supporting frame and disposed end to end, a rack connected with each scraper blade and extending upwardly therefrom, a pinion for each rack, a number of shafts each carrying one of said pinions, said shafts leading toward an approximate central position, and mechanism connected with all of said shafts to enable the operator located in said position to actuate all of said shafts simultaneously.

2. A device of the character described comprising an angle beam, means for dragging the same along a road while the length of said angle beam extends crosswise of the road, a scraper blade disposed adjacent the approximate middle of said angle beam, means controllable at the will of the operator for lowering said scraper blade into operative position and raising it out of operative position, and a catch basket connected with said angle beam and disposed rearwardly thereof, and means for lowering said catch basket into operative position and for raising it into inoperative position.

3. A road scraper comprising a beam, a cross bar secured to said beam and extending crosswise thereof, road wheels carried by said cross bar and located upon opposite sides of said beam, means controllable at the will of the operator for adjusting said cross bar relatively to said beam, means controllable at the will of the operator for adjusting said cross bar relative to said road wheels, and a scraper blade mounted upon said beam.

4. In a road scraper the combination of a beam, a plurality of cross bars secured to said beam and extending crosswise thereof, road wheels for supporting said cross bars and said beam, said road wheels being disposed in pairs, one pair to each cross bar, the wheels of each pair being located upon opposite sides of said beam, a plurality of scraper blades mounted upon said beam, and mechanism controllable at the will of the operator and connected with all of said scraper blades for adjusting the position of said scraper blades relatively to said beam.

5. A device of the character described comprising a scraper blade, a beam carrying said scraper blade, means for dragging said beam along a road to be operated upon by said scraper blade, a cross bar secured to said beam and provided with a pair of openings located upon opposite sides of said beam, a pair of racks extending through said openings and thus disposed on opposite sides of said beams, road wheels journaled upon said racks, and means at the will of the operator for adjusting said racks relatively to said cross bars.

6. A device of the character described comprising a beam, a number of cross bars secured rigidly to said beam, a pair of supporting members connected with each cross bar, and adjustable relatively thereto, the supporting members of each pair being disposed upon opposite sides of said beams, a road wheel journaled upon each supporting member, a plurality of scraper blades mounted upon said beam, a separate rack connected with each scraper blade for shifting the position thereof relatively to said beam, a pinion engaging each rack, a shaft connected with each pinion, and gearing controllable at the will of the operator and connected with all of said shafts for enabling the operator by actuating said gearing to adjust said scraper blades.

CHAS. M. DICUS.